US010051502B2

(12) United States Patent
Olsson et al.

(10) Patent No.: US 10,051,502 B2
(45) Date of Patent: *Aug. 14, 2018

(54) USER EQUIPMENT REPORTING OF CONNECTION LOSS

(71) Applicant: Telefonaktiebolaget L M Ericsson (publ), Stockholm (SE)

(72) Inventors: Andreas Olsson, Stockholm (SE); Robert Petersen, Linköping (SE); Per Elmdahl, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/012,601

(22) Filed: Feb. 1, 2016

(65) Prior Publication Data

US 2016/0150436 A1    May 26, 2016

Related U.S. Application Data

(63) Continuation of application No. 13/504,774, filed as application No. PCT/EP2010/006616 on Oct. 29, 2010, now Pat. No. 9,288,702.
(Continued)

(51) Int. Cl.
*H04W 24/00* (2009.01)
*H04W 24/10* (2009.01)
*H04W 76/19* (2018.01)

(52) U.S. Cl.
CPC ......... *H04W 24/10* (2013.01); *H04W 76/19* (2018.02)

(58) Field of Classification Search
CPC ..... H04W 24/02; H04W 24/04; H04W 24/08; H04W 24/10; H04W 36/0055
(Continued)

(56) References Cited

U.S. PATENT DOCUMENTS

2004/0203855 A1   10/2004   Veerasamy et al.
2009/0257353 A1   10/2009   Song et al.
(Continued)

FOREIGN PATENT DOCUMENTS

WO    2006063309 A2    6/2006
WO    2008086460 A2    7/2008

OTHER PUBLICATIONS

3rd Generation Partnership Project. "RLF Reports for Mobility Robustness Optimization." 3GPP TSG RAN WG3 Meeting #64, R3-091357, San Francisco, USA, May 4-8, 2009, pp. 1-5.
(Continued)

*Primary Examiner* — Temica M Beamer
(74) *Attorney, Agent, or Firm* — Coats & Bennett, PLLC

(57) ABSTRACT

Provided are methods for handling reports on lost connections in a terminal device which is capable of being in communication connection with a plurality of network access nodes, wherein the terminal device generates, after having lost connection to a first network access node, a report on the loss of connection. The terminal device stores the report when the terminal device is reconnected to a third network access node comprising one of a different access technology, a different network, and a different network operator than the first network access node to which the terminal device was connected before the loss of connection. The terminal device also sends, upon or after reconnecting with one of the first and a second network access node, sending the report to one of the first and second network access nodes.

24 Claims, 6 Drawing Sheets

Related U.S. Application Data

(60) Provisional application No. 61/256,659, filed on Oct. 30, 2009.

(58) Field of Classification Search
USPC .............. 455/423, 436, 67.11, 226.1, 226.2
See application file for complete search history.

(56) References Cited

U.S. PATENT DOCUMENTS

| | | |
|---|---|---|
| 2010/0067371 A1 | 3/2010 | Gogic et al. |
| 2010/0124173 A1 | 5/2010 | Agashe et al. |

OTHER PUBLICATIONS

3rd Generation Partnership Project. "UE Context Acquirement for Connection Re-establishment." 3GPP TSG-RAN WG3 Meeting #65, R3-091567, Shenzhen, China, Aug. 24-28, 2009, pp. 1-5.

3rd Generation Partnership Project. "Handover Cause Report for Mobility Robustness Optimization." 3GPP TSG RAN WG3 #65bis, R3-092301, Miyazaki, Japan, Oct. 12-15, 2009, pp. 1-2.

3rd Generation Partnership Project. "UE-Originated RLF Reports for Correct RLF Reason Detection." 3GPP TSG RAN WG3 Meeting #65-bis, R3-092501, Miyazaki, Japan, Oct. 12-15, 2009, pp. 1-3.

USER EQUIPMENT REPORTING OF CONNECTION LOSS

RELATED APPLICATIONS

This application is a continuation of U.S. patent application Ser. No. 13/504,774, filed 27 Apr. 2012, which is the National Stage of International Application No. PCT/EP2010/006616, filed 29 Oct. 2010, which claims the benefit of U.S. Provisional Application 61/256,659, filed 30 Oct. 2009, the disclosures of each of which are incorporated herein by reference in their entirety.

TECHNICAL FIELD

The present invention relates to methods and devices for handling reports on loss of connections between a terminal device and a network access node.

BACKGROUND

In telecommunication systems, particularly in mobile communication systems, very often measurements of the conditions, particularly quality, of an access medium (like radio access) is accomplished in order to detect problems or faults. Apart from such measurements, a terminal device, e.g. a user equipment as defined according to the LTE/SAE standard, can completely lose its connection to a network access node (in LTE, an evolved NodeB, eNB). It is often desired to obtain reports on such losses of connection, again in order to detect problems or faults.

For example, in 3GPP there is a work item (WI) called MDT (minimizing drive test). Within that WI the user equipment (UE) is asked to perform some measurements and report that to the network for analysis. Hence the need to perform costly drive test is minimized since the subscribers UEs can be used instead. For reporting these measurements, two alternatives exist, namely the "User Plane Solution" and the "Control Plane Solution", as described in the 3GPP TSG-RAN WG2 working document Tdoc R2-095779, http://www.3gpp.org/ftp/tsg_ran/WG2_RL2/TSGR2_67bis/Docs/R2-095779.zip.

Most of these measurements are related to radio quality, and it is natural for the UE to report it with existing mechanisms for control plane (RRC reports). However for one important measurement it is not straight forward, the report of loss of connection or "drop report". This report is used as a term for denoting the information an UE shall send to the network after the contact with a Base Station (i.e. a network access node) has been lost. Some information may include values such as position, radio measurements just before the drop etc.

One mechanism used in tracking such events is the so-called subscriber and equipment trace (S&E Trace), the structure of which is depicted in FIG. 1. The S&E Trace can be started towards several nodes in the LTE architecture. Once activated from a Network Management System (NMS) 11, each node records information and can forward this information (based on the included IP address in the activation message) to a Trace Collection Entity (TCE) 12 working as a central server. In the current 3GPP standard it is allowed to start an S&E Trace on a user equipment (UE) 13 and let the eNodeB (eNB) 14 configure the UE 13 to report some radio quality metrics, as is described in the following. Architecture, structure and functioning of S&E tracing are, for $3^{rd}/4^{th}$ generation mobile networks, described in 3GPP TS 32.421, 32.422, 32.423; Subscriber & Equipment Trace, and in 3GPP TS 32.441, 32.442, 32.443, 32.445; Trace management Integration Reference Point (IRP).

In the 3GPP TS 36.331, Radio Resource Control (RRC), the mechanisms for configuring the requested measurements is described for RRC reporting, i.e. for reporting over the control plane. As a short summary, the eNB can request measurements to be performed by the user equipment (UE) for radio quality aspects such as RSRP (Reference Signal Received Power) and RSRQ (Reference Signal Received Quality) in LTE (also in WCDMA similar mechanisms exist), then the UE will report the result of these measurement to the eNB that it is connected to. The eNB can then report this to the TCE if an S&E Trace is activated for that UE. An exemplary communication flow for control plane reporting is depicted in FIG. 2.

This type of control plane (RRC) reporting is advantageous in the respect that the UE only needs one reporting mechanism for radio related measurements.

However, one drawback of control plane reporting is the problem how to handle transferral of the report to the management system if a UE drops (i.e. loses connection), and reconnects to another cell. This problem is depicted in FIG. 3 and explained as follows:

For alternative 1 in FIG. 3, i.e. the UE 31 (which may correspond to the UE 11 of FIG. 1) connects to the same access node (eNB) 32 as before, the report can be communicated to the management system (represented by TCE 33) according to the same mechanism as when the call was not dropped. In this case, the UE 31 may report to the eNB 32 on the control plane which then may—as an option—process the data before transporting S&E Trace information to the TCE 33 (corresponding to TCE 12 in FIG. 1).

For alternative 2 in FIG. 3, i.e. the UE 31 connects to a different cell as before, e.g. to a different eNB 34, it is generally not known, or not in all cases known, how the information shall be reported. As one option, reporting may take place according to existing mechanisms to transport S&E Trace information to the TCE 33. This, however, is normally only possible if the new connection is to an access node (e.g. an eNB) 34 in the same network and the new access node (eNB) 34 has a trace activated. On the other hand, if the new access node (eNB) 34 has no trace activated, such a procedure may not necessarily work. Further, if the new access node 34 belongs to a different network or access technology (e.g. the previous access node 32 is an LTE eNB and the new access node 34 is a UMTS NodeB or a GSM base station), or even to a completely different network (PLMN), potentially of a different network operator, then there may be no possibility provided for handling the drop report.

Another mechanism of tracking is a solution in which the reports are communicated on the user plane (so-called "OMA reporting"). This mechanism is depicted in FIG. 4. As can be seen from FIG. 4, a report generated by the UE 41 (corresponding to UEs 11 and 31 of FIGS. 1 and 3) may be transmitted (indicated by the bar extending from the UE 41 to the OMA DM server 44) to a central server (OMA DM server) 44 in a way that is transparent for the nodes in between the UE 41 and the central server 44. For the eNB 42 and the Serving/Packet Data Network (S/PDN) gateway 43 the transmitted report would be seen and treated as any other user plane data. However, there is no interface to the NMS/TCE 45 to which reports should normally be communicated.

One advantage of this user plane reporting is that it can be done radio access technology (RAT) agnostic, since all the reports will be sent directly to the DM server 44 (and may potentially be forwarded to the NMS/TCE 45) for analysis.

On the other hand, this user plane reporting is disadvantageous as the implementation complexity for the UEs will increase since it will be required to support both the user plane and control plane reporting methods for the minimizing drive tests, and due to the fact that reports should be sent for other RATs than the one used for the reporting. Just as well, more data will be sent as reports from other RATs are included in the report. Further, there exists no interface yet between the OMA DM servers and TCE, so forwarding of a report to the NMS/TCE is not directly possible. As a still further aspect, it is difficult to correlate the measurements from the UE with the measurements from the network for the same call.

This is partly due to the fact that reporting according to the user plane solution becomes transparent to the eNB, i.e. the analysis and configuration of the reports is handled outside the eNB.

Generally, it is in some cases desirable that not only a central server, but the previous access node (eNB), i.e. the access node to which a UE was connected before the loss of connection, gets the drop report. By means of this report, an access node, e.g. an eNB, may find out a reason for the loss of connection and may possibly rectify or at least report the underlying problem. For instance, some transmission parameters may be adapted based on the drop report, antenna orientation may be adjusted or the like. Further, the size of the cell may be adapted, or even a new cell may be installed in case a coverage hole is detected.

However, it is apparent that with the user plane solution as described above there exist no means of communicating a drop report to the previous access node. The same applies for the control plane solution if a reconnect takes place at a different cell as before the loss of connection.

SUMMARY

The object of the present invention is therefore to provide methods and devices that enable reporting of a loss of connection under as many circumstances as possible, and preferably enable communicating a report on the loss of connection to the access node to which a terminal device, e.g. a user equipment (UE), was connected before the loss of connection occurred.

This object is achieved by a method for handling reports on lost connections in a terminal device which is capable of being in communication connection with a plurality of network access nodes, wherein the terminal device generates, after having lost connection to a first network access node, a report on the loss of connection and, upon or after reconnecting of the terminal device with the first or a second network access node, sends the report on the loss of connection to the first or second network access node.

This object is further achieved by a method for handling reports on lost connections in a network access node wherein the network access node receives a report on loss of connection from a terminal device, wherein the network access node forwards said report to a central server and/or to a further network access node, particularly the network access node to which the terminal device was connected before. Particularly, if the (second) access node to which the terminal is connected after having lost connection and which receives the report on loss of connection is a different node than the (first) access node to which the terminal device was connected before having lost connection, it may be provided that the report on the loss of connection generated by the terminal device is forwarded or sent to a central server or/and to the (first) network access node to which the user terminal was connected to before the loss of connection.

This object is further achieved by a terminal device comprising a receiver and a transmitter and being adapted to connect to an access node of a network, particularly of a wireless, e.g. a cellular radio network, said terminal device further comprising a report generator for generating a report on a loss of connection, wherein said transmitter is adapted to send said report to an access node upon or after reconnecting.

This object is further achieved by a network access node, particularly a network access node of a wireless, e.g. a cellular radio network, comprising a receiver and a transmitter and being adapted to be connected by a terminal device, wherein the receiver is adapted to receive reports on a loss of connection from a terminal device, and wherein the transmitter is adapted to forward or send a received report to a central server or to a different access node, particularly to an access node to which the terminal was connected before a loss of connection.

BRIEF DESCRIPTION OF THE DRAWINGS

Further characteristics and advantages of the invention will become better apparent from the detailed description of particular but not exclusive embodiments, illustrated by way of non-limiting examples in the accompanying drawings, wherein.

DETAILED DESCRIPTION

According to the invention, there is provided a method for handling reports on lost connections in a terminal device which is capable of being in communication connection with a plurality of network access nodes, wherein the terminal device generates, after having lost connection to a network access node, a report on the loss of connection and, upon or after reconnecting of the terminal device with the same or a different network access node, sends the report on the loss of connection to the network access node.

The terminal device may send said report before a connection between the terminal device and a core network has been set up, e.g. in the case of LTE before an initial context procedure is complete, or only after this connection has been set up, e.g. after an initial context procedure is complete.

The terminal device may, for instance, be a mobile communication device such as a cellular phone, PDA, laptop or else, generally denoted as user equipment (UE) or any other device adapted to perform communication with any type of network, be it a wireless or a fixed line network.

Wireless networks include, but are not limited to, access technologies such as GSM/GPRS/EDGE, UMTS, LTE, WLAN, Bluetooth etc., and fixed line networks include, but are not limited to, POTS, computer networks like ATM, Ethernet, IP or the like, etc.

Figure 5:
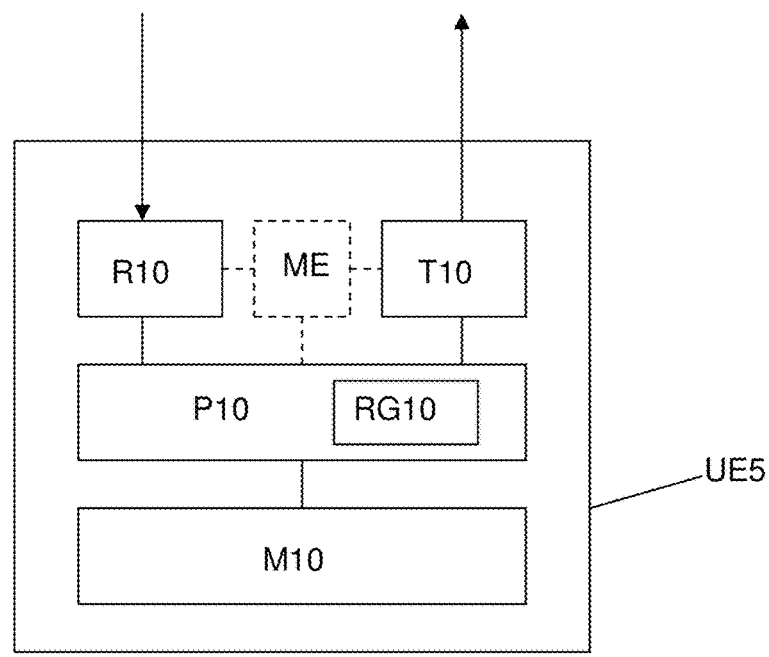
FIG. 5 is a block diagram depicting a terminal device.

The terminal device, as by way of example depicted as user equipment UE5 in the block diagram of FIG. 5, may comprise a transmitter T10 and a receiver R10 by which messages can be sent to and/or received from the network via the access node, as indicated by the arrows starting from transmitter T10 resp. ending at receiver R10. Of course, there may—in the case of wireless communication like mobile radio communication—also be provided one or more antennas coupled with transmitter T10 and/or receiver R10, said antennas in FIG. 5 being exemplarily represented by the mentioned arrows. In the case of fixed line communications, the mentioned arrows may indicate any type of communication line.

The terminal device resp. user equipment UE5 may further comprise a report generator RG10 for generating reports on a loss of connection; said report generator RG10 may be comprised in a processor P10, e.g. being implemented as a special purpose processor or in the form of software being executed on a processor (such as processor P10), or in a hybrid form, i.e. as a combination of hard- and software. Depending on the type of information to be comprised in the report, there may also be provided measurement devices like the measurement device ME shown in dashed lines, further processing devices or the like, which may be connected to transmitter T10 and/or receiver R10 in order to obtain data, e.g. position data, radio measurement data etc. for use in the report. Measurement device ME may also be connected to processor P10 and/or report generator RG10, e.g. in order to deliver measurements for further processing and/or incorporation in a report. The terminal device may further comprise a memory M10, e.g. a semiconductor or magnetic memory or the like, in order to store measurement data, report data and/or program data.

A network access node may accordingly be any device or network node or entity that provides access of the terminal device to any network, including the mentioned network technologies. For the example of mobile telecommunications, the network access node may e.g. be a base station in GSM, a NodeB in UMTS, an evolved NodeB (eNB) in LTE systems, or a WLAN router in a wireless LAN. In a fixed line network, the network access node may e.g. be a router or switch, like an Ethernet switch, a DSL Access Multiplexer, etc.

Figure 6:
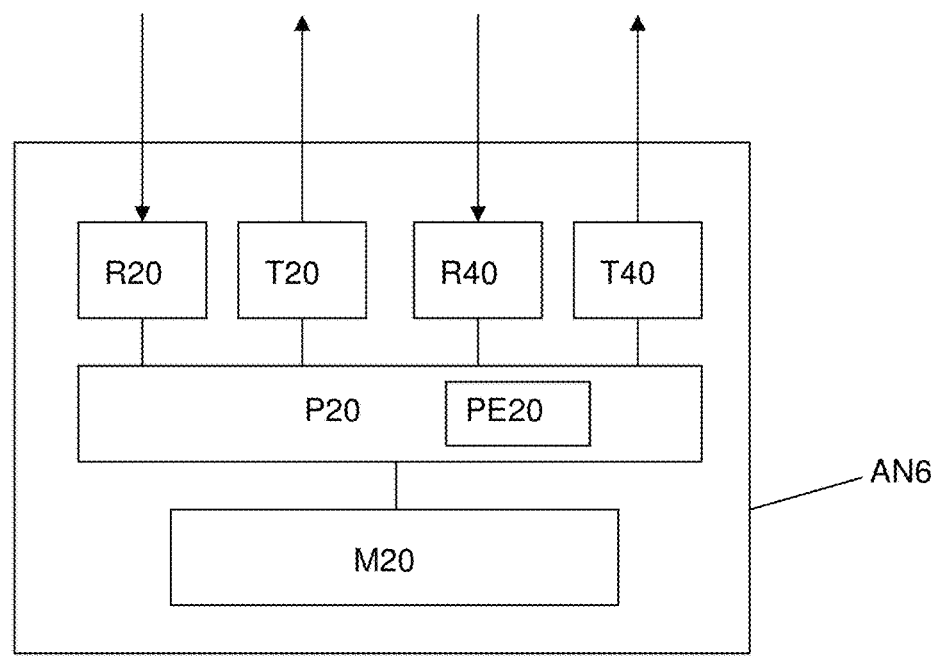
FIG. 6 is a block diagram depicting an access node.

Such network access node, as by way of example depicted as access node AN6 in the block diagram of FIG. 6, may comprise a transmitter T20 and a receiver R20 by which messages can be sent to and/or received from a terminal device, like the terminal device/user equipment UE5 of FIG. 5, and a further transmitter T40 and receiver T40 by which messages can be sent to and/or received from further network entities or nodes. Of course, it is conceivable that transmitters T20 and T40 may be the same transmitter or be combined in one transmitter, and/or that receivers R20 and R40 may be the same receiver or may be combined in one receiver.

Again, there may—in the case of wireless communication like mobile radio communication—also be provided one or more antennas coupled with transmitter T20 and/or receiver R20, said antennas in FIG. 6 being exemplarily represented by the mentioned arrows. In the case of fixed line communications, the mentioned arrows may indicate any type of communication line. Such a case may e.g. apply to transmitter T40 and receiver R40, which communicate with nodes or entities in the network, to which in many cases a fixed line connection (like ATM, Ethernet, optical link etc.) will be provided. However, it is of course also conceivable that transmitter T40 and receiver R40 may be connected to one or more antennas, being adapted to perform radio communication.

There may further be provided a processing entity PE20 for processing reports received from a terminal device like the user equipment UE5 of FIG. 5. Said processing entity PE20 may be comprised in a processor P20, being e.g. implemented as a special purpose processor or in the form of software being executed on a processor (such as processor P20), or in a hybrid form, i.e. as a combination of hard- and software. Said processing entity PE20 may be adapted to extract data from a report and process the data in the access node AN6, and/or to obtain address information from the data in order to determine a further network entity or node to which the report shall be communicated, be it by just forwarding or by sending pre-processed data. The network access node AN6 may further comprise a memory M20, e.g. a semiconductor or magnetic memory or the like, in order to store report data, (pre-)processed data and/or program data.

Accordingly, the connection between a terminal device like the user equipment UE5 of FIG. 5 and a network access node like the access node AN6 of FIG. 6 may be a radio-based connection if mobile or wireless communications are employed, or a wireline connection.

Figure 7:
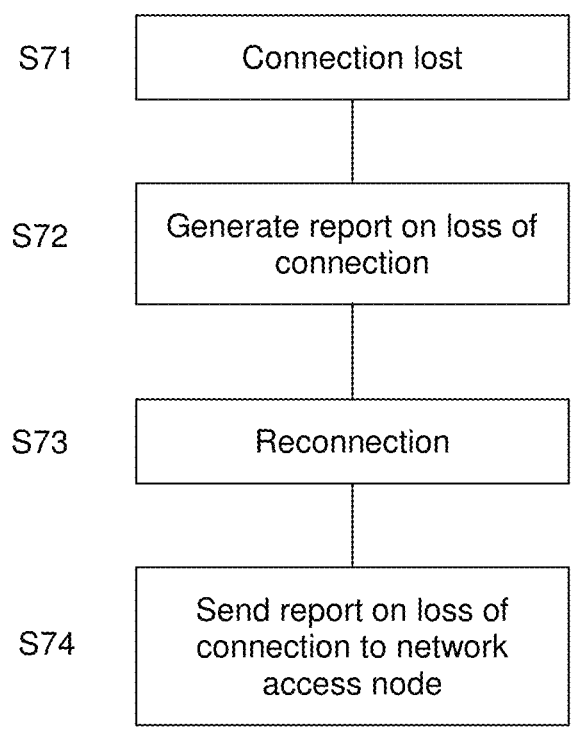
FIG. 7 is a flow chart of a method for handling drop reports in a terminal device.

FIG. 7 depicts a general method for handling reports on lost connections in a terminal device like user equipment UE5 of FIG. 5 which is capable of being in communication connection with a plurality of network access nodes.

After having lost connection to a network access node in step S71, the terminal device generates, in step S72, a report on the loss of connection and, upon or after reconnecting of the terminal device with the same or a different network access node in step S73, sends the report on the loss of connection to the network access node in step S74. It is also conceivable that step S72 of generating the report is performed at the time of reconnection in step S73 or even thereafter. In such a case, the terminal device stores relevant information regarding the loss of connection and generates the actual report later on.

The network access node with which the reconnection occurs may be the same (first) network access node as the one to which the terminal device was connected before the loss of connection, or a different (second) network access node. If the second network access node, i.e. the network access node to which the user terminal is connected to after the loss of connection, is different from the first network access node, i.e. the network access node to which the user terminal was connected to before the loss of connection, the second network access node may or may not be an network access node of the same access technology as the first network access node. It is for instance conceivable that the first network access node is an LTE network access node, while the second network access node is also an LTE network access node, or a UMTS or GSM network access node.

If the second network access node is different from the first network access node, they may also belong to the same network or network operator or to different networks or network operators, irrespective of the access technology of the first and second network access nodes. E.g., the first network access node may be an LTE network access node of a first network operator, while the second network access node may be an LTE or UMTS network access node of the same network operator, or the second network access node may be an LTE or UMTS network access node of a different (second) network operator.

It is therefore noted that the sending of the report in step S74 does not necessarily have to occur upon the first reconnection after a loss of connection. Instead, the terminal device may store the report for later sending, as will be further elaborated below.

Generally, it may be provided that the report on the loss of connection generated by the terminal device is forwarded or sent to a central server or/and to the (first) network access node to which the user terminal was connected to before the loss of connection.

Figure 8:
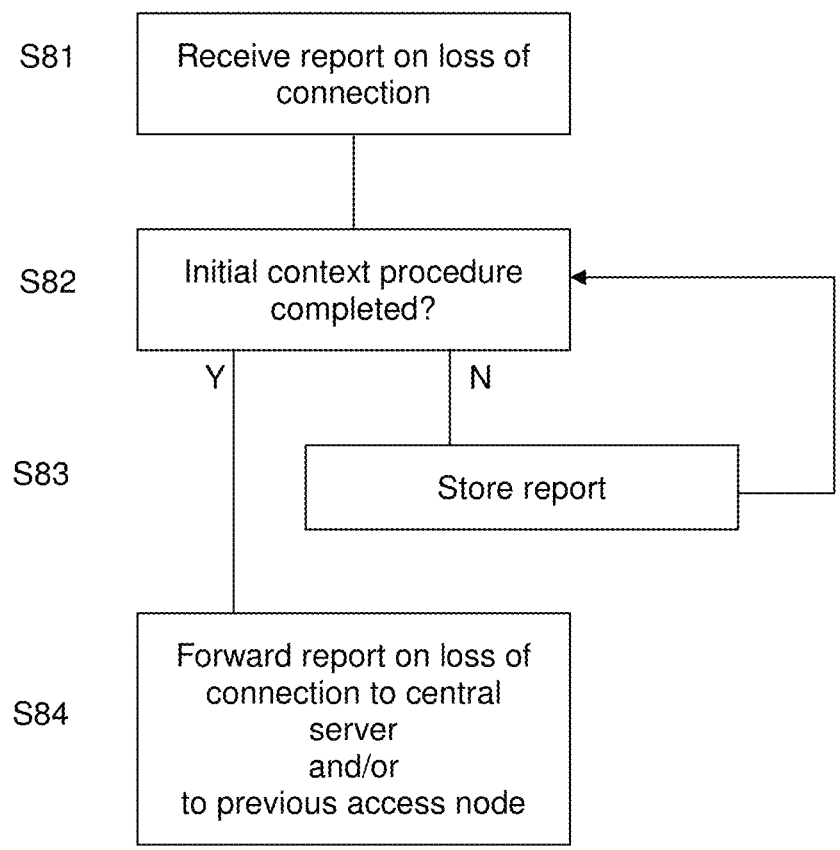
FIG. 8 is a flow chart of a method for handling drop reports in a network access node.

Accordingly, FIG. 8 shows a method for handling reports on lost connections in a network access node wherein the network access node receives, in step S81, a report on loss of connection from a terminal device, and wherein the network access node forwards said report to a central server and/or to a network access node to which the terminal device was connected before in step S84. If the network access node receiving the report from the terminal device is the same as the network access node to which the terminal device was connected before losing connection, forwarding of the report to another network access node may not be necessary; in such a case, the report may be processed in the network access node itself and/or forwarded to a central server, e.g. as a normal part of the S&E functionality.

Said central server may, in a mobile communication environment, e.g. be a trace collection entity (TCE) as described above.

In case the terminal device already sends the report before an initial context procedure is complete, as indicated in step S82, the network access node may store the report in step S83 until the procedure is complete, i.e. loop back to step S82 in which completion of the initial context procedure is checked. When the initial context procedure is completed in step S82, the method proceeds to step S84 in which the report is forwarded to the central server and/or the previous access node. This may be provided e.g. in cases when the network access node only knows how to handle the report after completion of the context procedure. Such a case can for example occur in an S&E trace setting as described above, wherein the network access node (e.g. an eNodeB) can only know if a trace is activated when the initial context procedure is complete. Note that the method steps S82 and S83 are optional in the flow chart of FIG. 8, i.e. it is also possible that a received report on loss of connection is directly forwarded to a central server and/or a previous (first) access node.

It may particularly be provided that, in case the network access node to which the user terminal is connected to after reconnection is different from the (first) network access node to which the user terminal was connected to before the loss of connection, the report on loss of connection is made available to the first network access node. As mentioned before, it may for several reasons be advantageous if the first network access node has the report on loss of connection available in order to be able to report or fix potential problems or faults.

Therefore, it may in such a case be provided that the second network access node sends, forwards or relays the report on loss of connection to the first network access node.

However, such sending, forwarding or relaying may not be possible if the second network access node belongs to a different access technology, network or network operator than the first network access node. In such a case, but not only then, the report may be stored by the terminal device.

If the report has been stored, the terminal device can later on, when the terminal device is again connected to a second network access node of the technology, network or network operator of the first network access node to which the terminal device was connected before loss of connection, send the report to said second network access node. Said second network access node can further process the received report according to the method described above, particularly by forwarding it to a central server and/or to the first network access node.

It is conceivable that the terminal device sends the report to a plurality of network access nodes upon or after connecting to the respective network access node, e.g. when connecting to different network access nodes of different access technologies, networks or network operators subsequently. In such a case, the terminal device may provide an indicator in the report on how many times the report has already be sent, e.g. by using a revision number, counter or else. By means of this indicator, an entity finally receiving and processing the report (e.g. a central server or the first network access node) can match received reports and only needs to use one report for a certain event of loss of connection.

When the report has been stored in the terminal device, it may be provided that the report is stored for a predetermined or dynamically adapted amount of time, and/or until a memory usage in the terminal device reaches or exceeds a predetermined or dynamically adjusted level, and is then discarded.

If the terminal device is connected to a second network access node of a different access technology (e.g. radio access technology, like LTE, UMTS, GSM) than the first network access node to which it was connected before the loss of connection, it may send the report on loss of connection with a generic message type for the access technology of the second network access node.

In such a case, or generally if a network access node receives a report on loss of connection relating to an access technology not supported by this network access node, the network access node can, in a method as described above, forward said report to a central server or to a network access node, preferably the first network access node to which the terminal device was connected before the loss of connection, of the network to which the first network access node belonged.

Several possibilities exist for such forwarding. According to one alternative, the forwarding can be accomplished by an information management procedure to the first network access node. In this case, information must be available to the network access node on how to address the first network access node. E.g., functionality similar to ANR as described further below may be used in order to determine an address, like an IP address, of the first network access node. It may also be provided that an address, e.g. an IP address, or any kind of identification of the first network access node is included in the report on loss of connection. According to a second alternative, forwarding can be accomplished by an information management procedure to a central server of the network of the first network access node. In this case, the report preferably comprises an address (e.g. IP address) of the central server.

A report on loss of connection as generated by a terminal device may comprise several kinds of information, for instance subscriber or location information and/or information relating to the network conditions under which the loss of connection occurred, and/or information related to further processing and/or relaying of the report. Subscriber information may comprise e.g. identification information relating to the subscriber (user of the terminal device) or the terminal device itself; location information may comprise e.g. information about a network cell the terminal device inhabited prior to the loss of connection and/or the access node the user terminal was connected to, GPS data, or other location-based data; information related to network conditions may comprise measurements of network quality, e.g. experienced data rates and/or error rates, field strength measures, interference measures or the like; information related to further processing and/or relaying of the report may comprise instructions on how to handle the report and/or where the report as a whole or parts of it should be forwarded or relayed to.

It may be provided that a network node or entity that requires or wishes to receive certain information, e.g. the access node to which a terminal device is connected or a central server like a TCE, announces to the terminal device that such information is requested in case a loss of connection occurs, and may also provide an address or identifier indicating where the report is to be delivered.

In the case of a cellular radio network according to the LTE standard, the information comprised in a report may include the E-UTRAN Cell Global Identity (eCGI) of the cell in which the drop occurred. If the report is to be handed on to a central server, e.g. the TCE in case of S&E tracing, the report may include an identifier, e.g. the IP address, of said central server. Just as well, there may be included a trace reference in the report. These provisions can each be made by predetermination or on request by the eNB or a central server.

In cases where a terminal device connects to a different (second) access node after having experienced a loss of connection than the (first) access node to which it was connected before the loss of connection, it may be desired that the first access node receives a report on the loss of connection. There are several possibilities on how such a report may be delivered to the first access node.

In case the second access node has any kind of direct communication connection to the first access node, e.g. the two access nodes being in neighboured cells of a cellular radio network, the report may be directly sent by the second access node to the first access node. If such direct communication connection is not available, the report may be sent via a further network node which is in communication connection with both access nodes or can establish such connection.

In the following, exemplary embodiments are described which relate to an LTE/SAE network; for such a case, and with relation to the terms as used and the devices as described above, a user equipment (UE) corresponds to a terminal device, an eNodeB (eNB) corresponds to an access node, and the TCE corresponds to the central server. Further, "drop" denotes a loss of connection, and "drop report" a report on a loss of connection. Accordingly, a dropping eNB denotes an access node to which a terminal device (or user equipment, UE) was connected before the loss of connection occurred, and a "dropping cell" denotes a cell in a cellular network being served by the dropping eNB. "Serving eNB" denotes the eNB (i.e. access node) to which the UE is connected after a loss of connection (drop), and "serving cell" denotes a cell in a cellular network being served by the serving eNB.

It is apparent that, while the embodiments described in the following are illustrated with respect to an LTE/SAE network, the general methods and devices as defined above are applicable to a plurality of other network architectures or access technologies, wireless or fixed line, such as UMTS, GSM/GPRS/EDGE, WLAN, DSL, Ethernet, etc.

According to a first embodiment, the following course of actions/events takes place:

1. The network (e.g. a server within the network, the access node to which the UE is currently connected, or some other network entity) orders the UE to perform a measurement, e.g. based on the legacy functionality of S&E Trace activation in the NMS (Network Management System).
2. The UE drops.
3. The UE is once again connected to a LTE cell. If the UE already has sent the drop report to a radio access node, it may resend the drop report with an (optional) revision number or similar to indicate that the report has already been sent once (so that the receiving entity only needs to use one of the drop reports).
4. UE sends the "drop report" with an RRC message to the serving eNB. If the UE sends the log info before the Initial context procedure is complete, the eNB may save it until the procedure is complete for guidance on how to handle the entry (note that only after the completion of this procedure the eNB can know if a trace is activated or not for that UE). It may also be provided that the UE is not allowed to send the report until the Initial context procedure is complete.
5. The eNB that currently the UE is connected to (serving eNB) handles this report from the UE:
   a. As Option A, the report may be included in the log file for S&E Trace, just as any other information to be included in this log (in this case, at Initial context Setup procedure on S1AP, the eNB may be informed that a Trace shall be activated).
   b. As Option B, the serving eNB then relays the information to the eNB where the drop occurred (dropping eNB), the dropping eNB then can optionally process the data before transporting S&E Trace information to the TCE.

According to a second embodiment, the following course of actions/events takes place:

1. Steps 1 and 2 like in the first embodiment.
2. UE is connected to a non-LTE cell.
3. UE saves the "drop report"; it may optionally be provided that the "drop report" is saved for a certain amount of time (e.g. a predetermined number of time units) or until memory in UE reaches a certain level and is then discarded.
4. Steps 3-5 like in the first embodiment.

According to a third embodiment providing an alternative to the second embodiment, the following course of actions/events takes place:

1. Steps 1 and 2 like in the first embodiment
2. UE is connected to a non-LTE cell
3. UE sends the "drop report" with a generic message type for that RAT (Radio Access Technology) to the now serving base station/access node.
4. The radio access network for the now serving base station/access node can forward the "drop report":
   a. Alternative 1: with e.g. RIM (RAN Information Management Procedure) to the eNB where the UE last had contact with (based on eCGI info in the drop report and usage of "ANR like"—see further below—functionality to find the IP address of that eNB). The eNB handles this as any other information to be included in the log file for S&E Trace (in this case, the UE may identify itself with a trace reference).

b. Alternative 2: with e.g. RIM (RAN Information Management Procedure) to the TCE of the LTE System (e.g. based on the IP address of the TCE info in the drop report).
5. As an option, Steps 3-5 like in the first embodiment may be employed.

Generally, in case the drop occurred with an LTE access node (eNB) and the UE is subsequently connected to a non-LTE access node, this access node may report the info back to the LTE access network (or the TCE), e.g. via the control signalling interfaces (e.g. S1-, A- or Iu-interfaces) or via management interfaces (e.g. Itf-N).

Further, the procedures according to the second or third embodiments may also be employed when the UE connects to an LTE cell again after the drop occurred, but there is no S&E Trace activated in the serving eNB. However, in such a case it may also be provided that the serving eNB is adapted to comply with this situation, e.g. by nevertheless forwarding the error report to the TCE.

According to a fourth embodiment providing an alternative to the second embodiment, the following course of actions/events takes place:
1. Steps 1 and 2 like in the first embodiment
2. UE is connected to a different PLMN
3. UE saves the "drop report"; it may optionally be provided that the "drop report" is saved for a certain amount of time (e.g. a predetermined number of time units) or until memory in UE reaches a certain level and is then discarded.
4. Steps 3-5 like in the first embodiment, or steps 2 to 5 of the third embodiment.

Generally, in embodiments where the drop report is saved, this may be provided for a limited time only, or depending on memory restrictions, or until an access node is connected that is able to handle the drop report (e.g. in a procedure according to the first or third embodiment). It may, however, also be provided that the drop report is discarded upon a reconnect in certain cases, e.g. when a different PLNM is connected to.

With the procedures as described above with reference to the different embodiments, it is possible to handle drop reports (reports on loss of connection) in as many cases as possible, and make such reports available to the network nodes that are intended to receive such reports under at least most conceivable circumstances. As mentioned before, these reports provide useful information for improving network operation without generating too heavy processing or measuring load on the network components. Accordingly, with the described methods and procedures, an improved network operation may be achieved.

For the first embodiment as described above, in the following procedures are described how a drop report may be communicated further on to a network node intended to receive the report, e.g. the dropping eNB (access node to which the terminal device was connected before the loss of connection) or the TCE (central server). There are several solutions depending on the relation between the dropping cell and the serving cell.

If the dropping cell is a neighbour of the serving cell, the serving cell knows about the existence of the dropping cell. In other words, the Neighbour Relation Table of the serving cell has an entry for the dropping cell. Therefore, in step 5) b. of the first embodiment, the serving cell may search its Neighbour Relation Table (NRT), and if a match is found, it may send the Drop Report to the dropping cell, e.g. using X2.

The case may occur that the dropping cell is a neighbour to the serving cell, but X2 connections are not allowed, i.e., the serving cell has an entry for the dropping cell in its NRT, but the entry has the "No X2" flag set, or the serving eNB has an according entry in a X2 blacklist, which means that the serving cell's eNB is prohibited from having X2 connections to the dropping cell's eNB. In such a case, in step 5) b. of the first embodiment, the serving cell may search its NRT and, if a match is found, but also the "No X2" flag set, the serving cell may send the Drop Report (e.g. over the S1 interface) to the MME, which relays the Drop Report (possibly using other MMEs) to the dropping cell's eNB (e.g. over the S1 interface).

On the other hand, if the dropping cell is not a neighbour to the new cell, but the cells can contact each other using X2, this means that the serving cell has no knowledge about the dropping cell. In other words, the NRT of the serving cell has no entry for the dropping cell. In this case, in step 5) b. of the first embodiment, the serving cell may search its NRT but finds no match. The serving cell may then use the eGGI of the dropping cell (potentially included in the drop report) to find the IP address of the dropping cell, and subsequently send the Drop Report to the dropping cell, e.g. using X2.

In the above case, when the dropping cell is not a neighbour of the serving cell and the cells can not contact each other using X2, then a different approach may be employed. In such a case, in step 5) b. of the first embodiment, the serving cell may search its NRT but finds no match, and then may use the eCGI of the dropping cell to find the IP address of the dropping cell, just as described above. The serving cell then may attempt to set up an X2 connection to the dropping cell, but fails. If this occurs, the serving cell may send the Drop Report to the dropping cell in a similar manner as in the case above where X2 connections are not allowed, e.g. using S1.

Finally, Automatic Neighbour Relation (ANR) may be employed for cell-to-cell connections, as will now be described with reference to FIG. 9. Automatic Neighbour Relation is a functionality by which neighbour relations can be added automatically to a cell without manual work by the operator.

Figure 9:
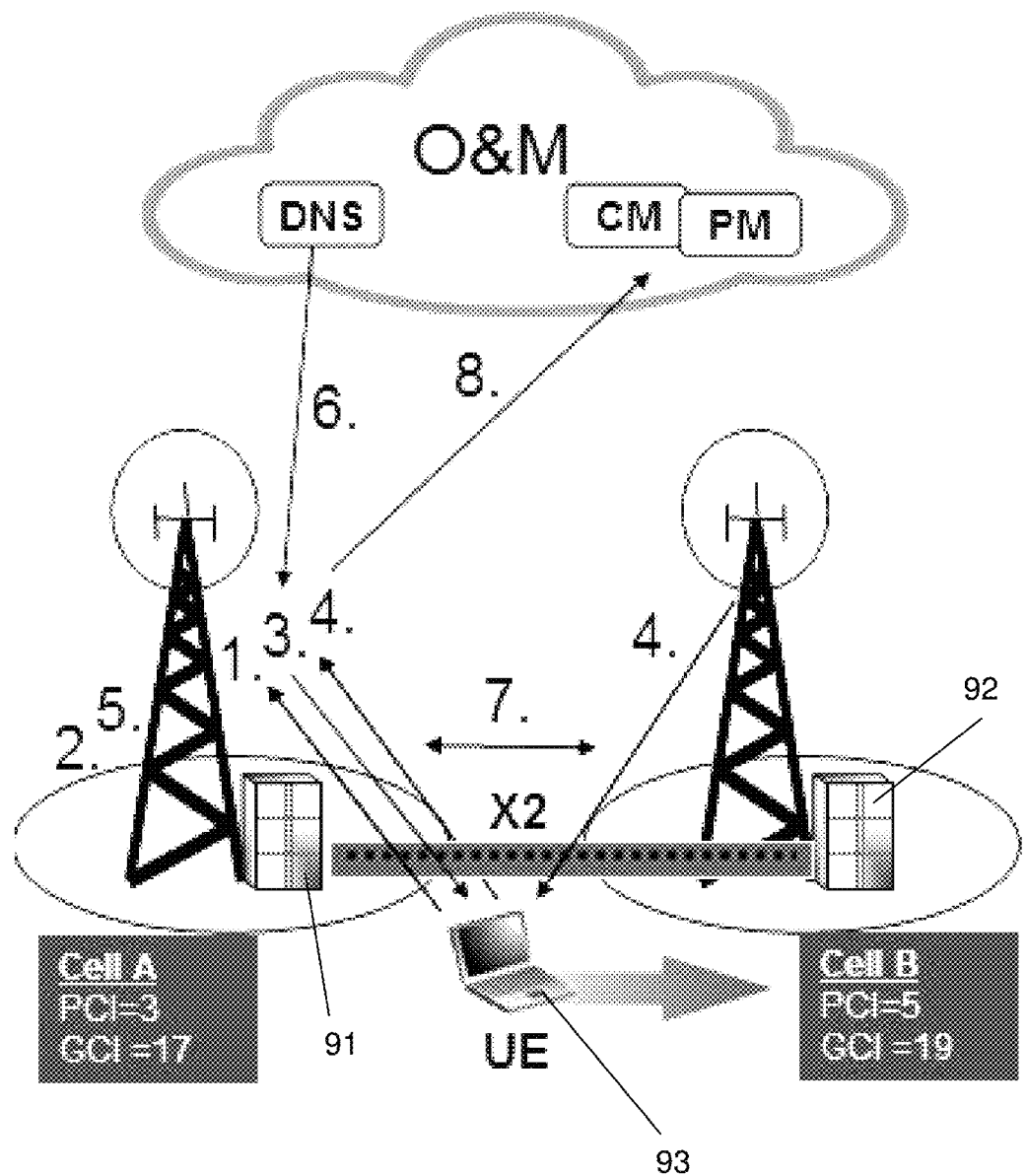
FIG. 9 is a diagram showing set-up and procedure for ANR.

FIG. 9 shows a user equipment (UE) 93 being at first connected to network access node 91 belonging to a network cell A, wherein connection to network access node (eNB) 91 is lost and user equipment 93 is reconnected to a network access node (eNB) 92 belonging to a network cell B, resp. UE 93 is handed over from eNB 91 in cell A to eNB 92 in cell B.

An exemplary procedure for ANR in a network is as follows, wherein the method steps as indicated below correspond to the numbers in FIG. 9.
1. 'UE' 93 reports measurement for handover; physical cell identity (PCI, layer 2 identity of cell)=5 best
2. 'eNB for cell A' 91 concludes PCI=5 not known
3. 'eNB for cell A' 91 orders UE 93 to read global cell identity (GCI, Layer 3 cell identity) for 'Cell B'
4. UE 93 reads and reports GCI from broadcast for 'Cell B'
5. 'eNB for cell A' 91 checks if cell B is allowed, e.g. using a black list
6. 'eNB for cell A' 91 reads IPadr for 'Cell B' (GCI), e.g. from DNS
7. X2 is established symmetrically A-B i.e. IPsec, sctp-x2ap, neighbour list updated. Handover can be executed
8. 'eNB for cell A' 91 updates OSS-RC and observation data i.e. counters for ANR Such ANR functionality may e.g. be employed in the above-described methods in order to identify neighbouring cells, which then may be contacted in order to transfer drop reports.

Clearly, several modifications will be apparent to and can be readily made by the skilled in the art without departing from the scope of the present invention. Particularly, the embodiments as illustrated above are not to be understood as limiting, but rather as exemplary for the general functionality according to the invention.

What is claimed is:

1. A method performed by a terminal device for handling reports on lost connections, comprising:
    after determining a loss of connection to a first network access node, generating a report on the loss of connection to the first network access node, and
    in response to determining that the terminal device is connected to a second network access node having a same access technology, a same network, or a same network operation as the first network access node, sending, to the second network access node, the report on the loss of connection to the first network access node, wherein the first and second network access nodes are different nodes.

2. The method according to claim 1, wherein said report is stored by the terminal device when the terminal device is reconnected to a third network access node that is one of a different access technology, a different network, and a different network operator than the first network access node to which the terminal device was connected before the loss of connection.

3. The method according to claim 2, wherein said report is stored for at least one of a predetermined amount of time, a dynamically adapted amount of time, and until a memory usage in the terminal device reaches or exceeds one of a predetermined or dynamically adjusted level, and is then discarded.

4. The method according to claim 1, wherein the terminal device, when reconnected to the second network access node, network, or network operator of the first network access node, sends the report to said second network access node.

5. The method according to claim 1, wherein the terminal device subsequently sends the report to a plurality of network access nodes.

6. The method according to claim 5, wherein the report comprises an indicator on how many times the report has already be sent.

7. The method according to claim 1, wherein the terminal device, when reconnected to the second or a third network access node that is an access node of a different access technology than the first network access node to which the terminal device was connected before the loss of connection, sends the report on loss of connection with a generic message type for the access technology of the second or third network access node.

8. The method according to claim 1, wherein the report on loss of connection comprises address information including an IP address of at least one of a central server and the first network access node to which the terminal device was connected before the loss of connection.

9. A method performed by a second network access node for handling reports on lost connections, comprising:
    receiving, from a terminal device, a report on a loss of connection to a first network access node, wherein the terminal device sends the report to the second network node responsive to determining that the terminal device is connected to a second network access node having a same access technology, a same network, or a same network operation as the first network access node, wherein the first and second network access nodes are different nodes, and
    forwarding or sending said report to at least one of a central server and a further network access node.

10. The method according to claim 9, wherein the network access node is a different access node than a first access node to which the terminal device was connected before having the lost connection, and wherein said report is forwarded or sent to at least one of the central server and a first network access node to which the user terminal was connected to before the loss of connection.

11. The method according to claim 9, wherein the network access node receives the report on loss of connection relating to an access technology not supported by the network access node, and wherein said report is forwarded to one of a central server and a first network access node to which the terminal device was connected before the loss of connection.

12. The method according to claim 9, wherein said forwarding the report on the loss of connection to at least one of the central server, the further network access node, and a first network access node to which the terminal device was connected before the loss of connection is accomplished by an information management procedure.

13. The method according to claim 9, wherein said forwarding or sending said report to the at least one of the central server, the further network access node, and a first network access node to which the terminal device was connected before the loss of connection is accomplished by relayed sending via an additional network node.

14. The method according to claim 9, further comprising obtaining or determining address information including an IP address of at least one of the central server, the further network access node, and a first network access node to which the terminal device was connected before the loss of connection.

15. The method according to claim 14, wherein the address information of the further network access node or the first network access node to which the terminal device was connected before the loss of connection is determined based on automatic neighbor relation.

16. The method according to claim 9, wherein the report on loss of connection comprises address information including an IP address of at least one of the central server and a first network access node to which the terminal device was connected before the loss of connection.

17. A terminal device comprising:
    a transceiver adapted to connect to a first network access node, and
    a report generator adapted to generate a report on a loss of connection to the first network access node after determining the loss of connection to the first network access node, and
    wherein said transceiver is further adapted to send said report to a second network access node responsive to determining that the terminal device is connected to the second network access node having a same access technology, a same network, or a same network operation as the first network access node, wherein the first and second network access nodes are different nodes.

18. The terminal device according to claim 17, wherein said terminal device is adapted to connect to the access node of a wireless network of a cellular radio network.

19. The terminal device according to claim 17, wherein the terminal device is configured to generate the report on the loss of connection after having lost connection to the access node, and send the report on the loss of connection to one of first and second network access nodes upon or after reconnecting.

20. A network access node comprising:
a transceiver adapted to:
receive, from a terminal device, a report on a loss of connection to a first network access node, wherein the terminal device sends the report to the second network node responsive to determining that the terminal device is connected to a second network access node having a same access technology, a same network, or a same network operation as the first network access node, wherein the first and second network access nodes are different nodes, and
forward or send said report to at least one of a central server and a further network access node.

21. The network access node according to claim 20, wherein the network access node is configured to operate within a wireless network, including a cellular radio network.

22. The network access node according to claim 20, wherein the network access node is configured to receive a report on the loss of connection from the terminal device, and forward or send said report to at least one of a central server and a further network access node.

23. The method according to claim 1, wherein said sending the report on the loss of connection to the first network access node is responsive to storing the report.

24. The method according to claim 1, wherein said sending includes sending or forwarding to the first network access node via the second network access node.

* * * * *

UNITED STATES PATENT AND TRADEMARK OFFICE
CERTIFICATE OF CORRECTION

PATENT NO. : 10,051,502 B2
APPLICATION NO. : 15/012601
DATED : August 14, 2018
INVENTOR(S) : Olsson et al.

Page 1 of 2

It is certified that error appears in the above-identified patent and that said Letters Patent is hereby corrected as shown below:

On the Title Page

In Figure, delete " 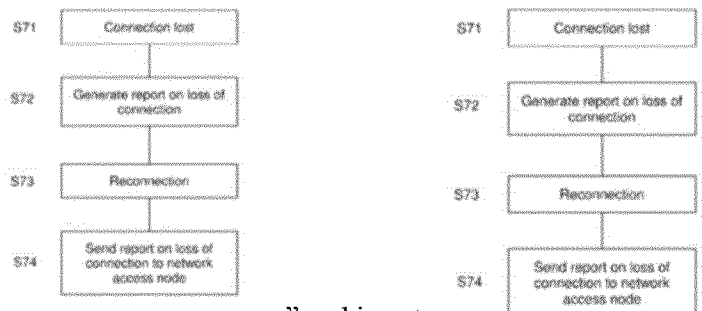 " and insert -- 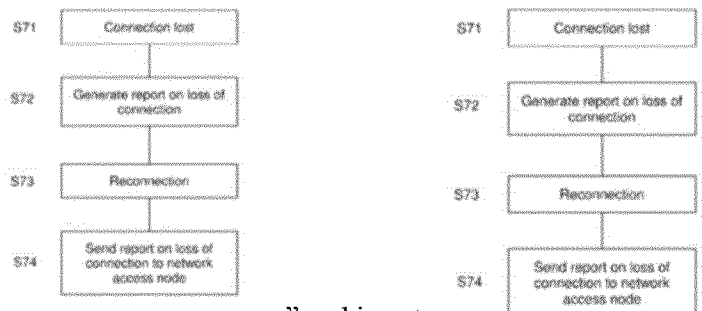 --, therefor.

In the Drawings

Figure 1:
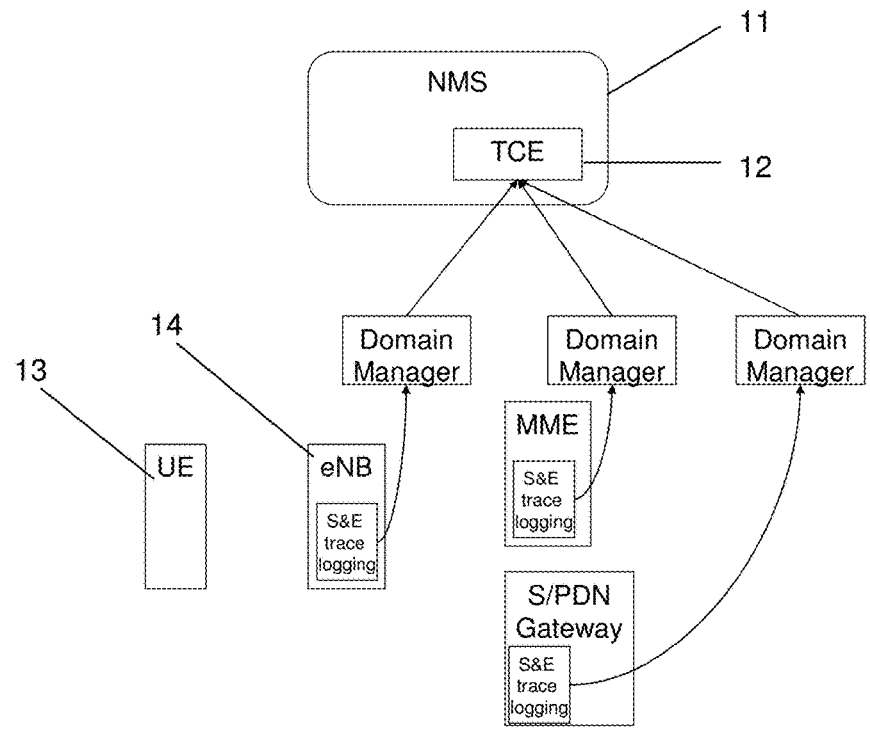
FIG. 1 is a structural block diagram of an S&E Trace mechanism.
Figure 2:
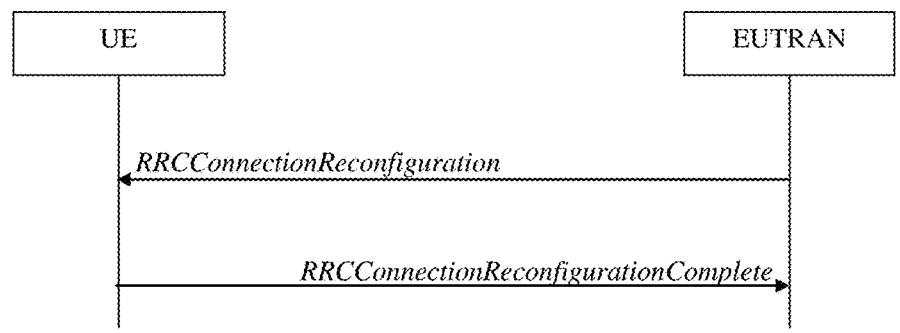
FIG. 2 is a signalling diagram depicting signalling to configure the UE to report measurements.
Figure 3:
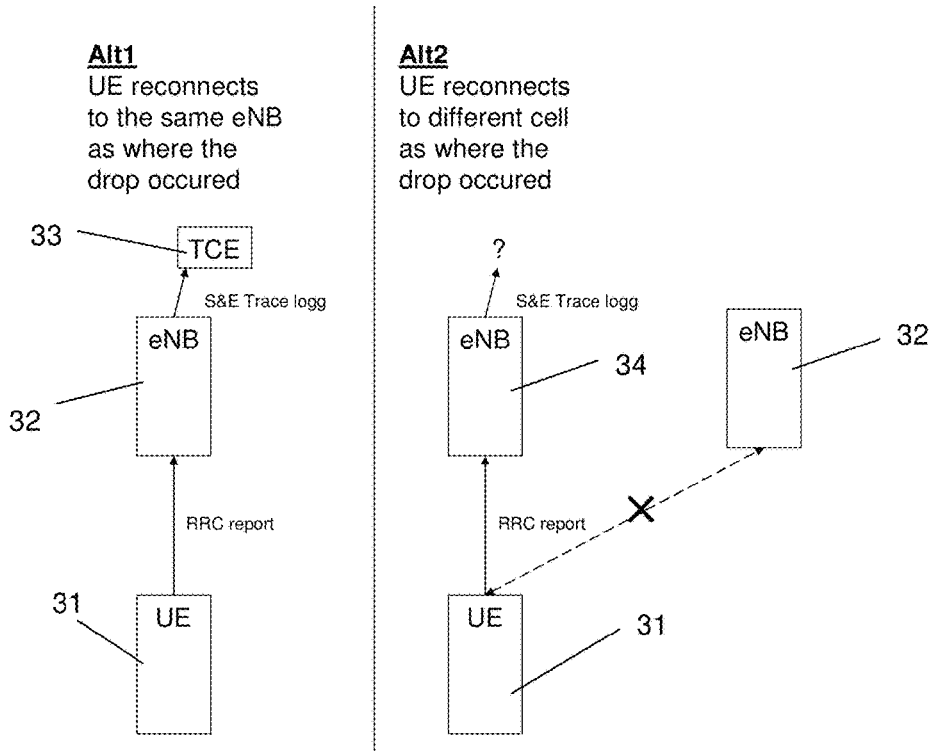
FIG. 3 shows alternatives of reconnections of a user equipment after a connection loss.

In Fig. 3, Sheet 2 of 6, under "Alt1", Line 4, delete "occured" and insert -- occurred --, therefor.

In Fig. 3, Sheet 2 of 6, under "Alt2", Line 4, delete "occured" and insert -- occurred --, therefor.

Figure 4:
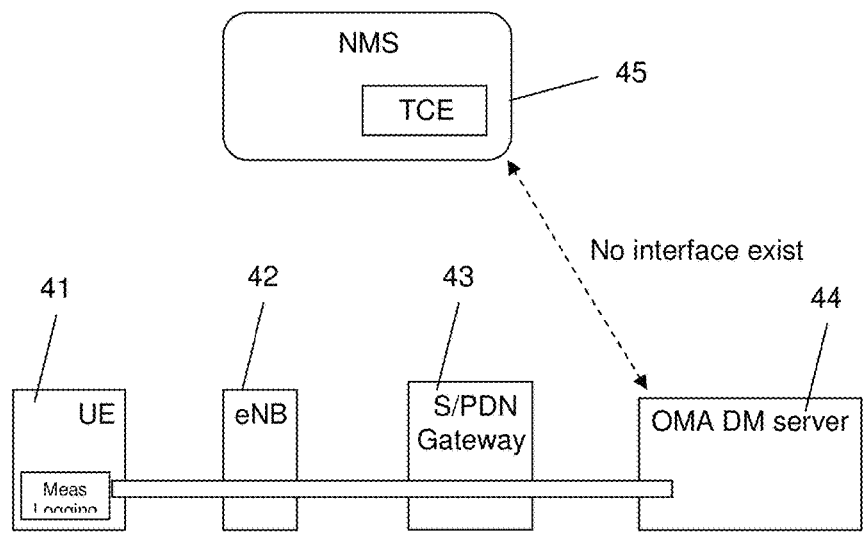
FIG. 4 is a block diagram depicting the mechanism of user plane reporting.

In Fig. 4, Sheet 2 of 6, delete " 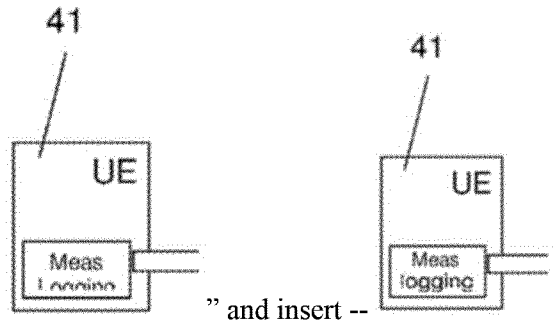 " and insert -- 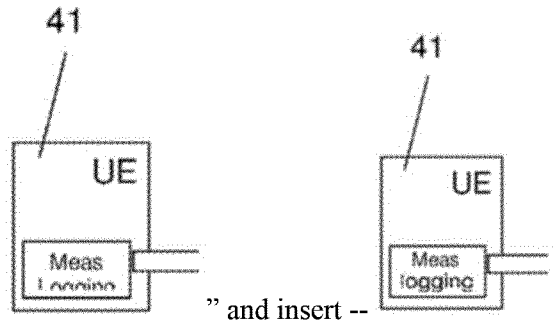 --, therefor.

Signed and Sealed this
Nineteenth Day of February, 2019

Andrei Iancu
*Director of the United States Patent and Trademark Office*

CERTIFICATE OF CORRECTION (continued)
U.S. Pat. No. 10,051,502 B2

In the Specification

In Column 1, Line 7, delete "2012," and insert -- 2012, now Pat. No. 9,288,702, --, therefor.

In Column 2, Line 26, delete "UE 11" and insert -- UE 13 --, therefor.

In Column 5, Line 54, delete "receiver T40" and insert -- receiver R40 --, therefor.

In Column 8, Line 18, delete "already be sent," and insert -- already been sent, --, therefor.

In Column 12, Line 20, delete "eGGI" and insert -- eCGI --, therefor.

In Column 12, Line 67, delete "ANR" and insert -- ANR. --, therefor.

In the Claims

In Column 13, Line 48, in Claim 6, delete "already be sent." and insert -- already been sent. --, therefor.